Nov. 29, 1949  R. A. LEE  2,489,424
CONTROL UNIT
Filed Dec. 11, 1943  4 Sheets-Sheet 1
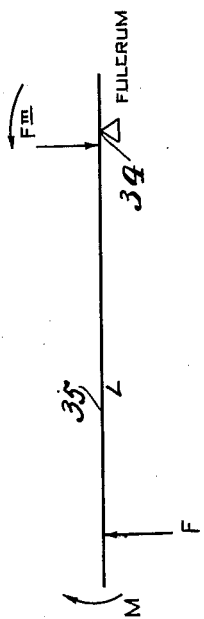
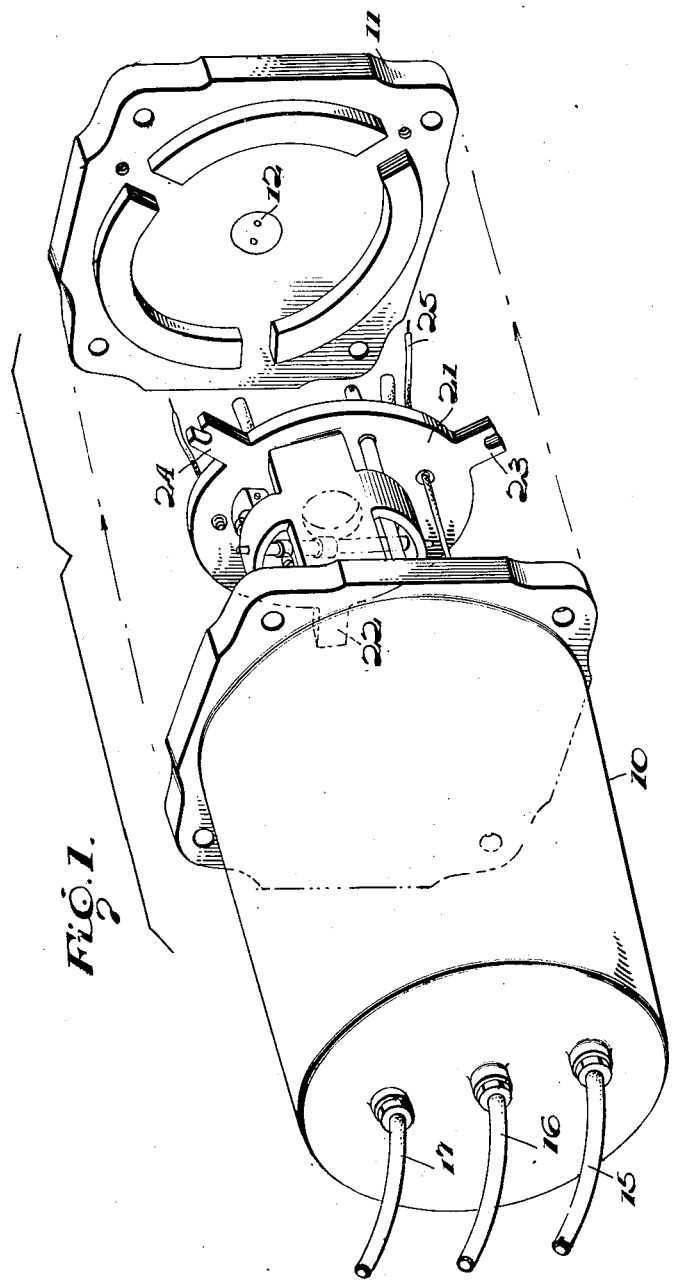
INVENTOR.
Richard A. Lee.
BY
Herbert M. Birch
ATTORNEY

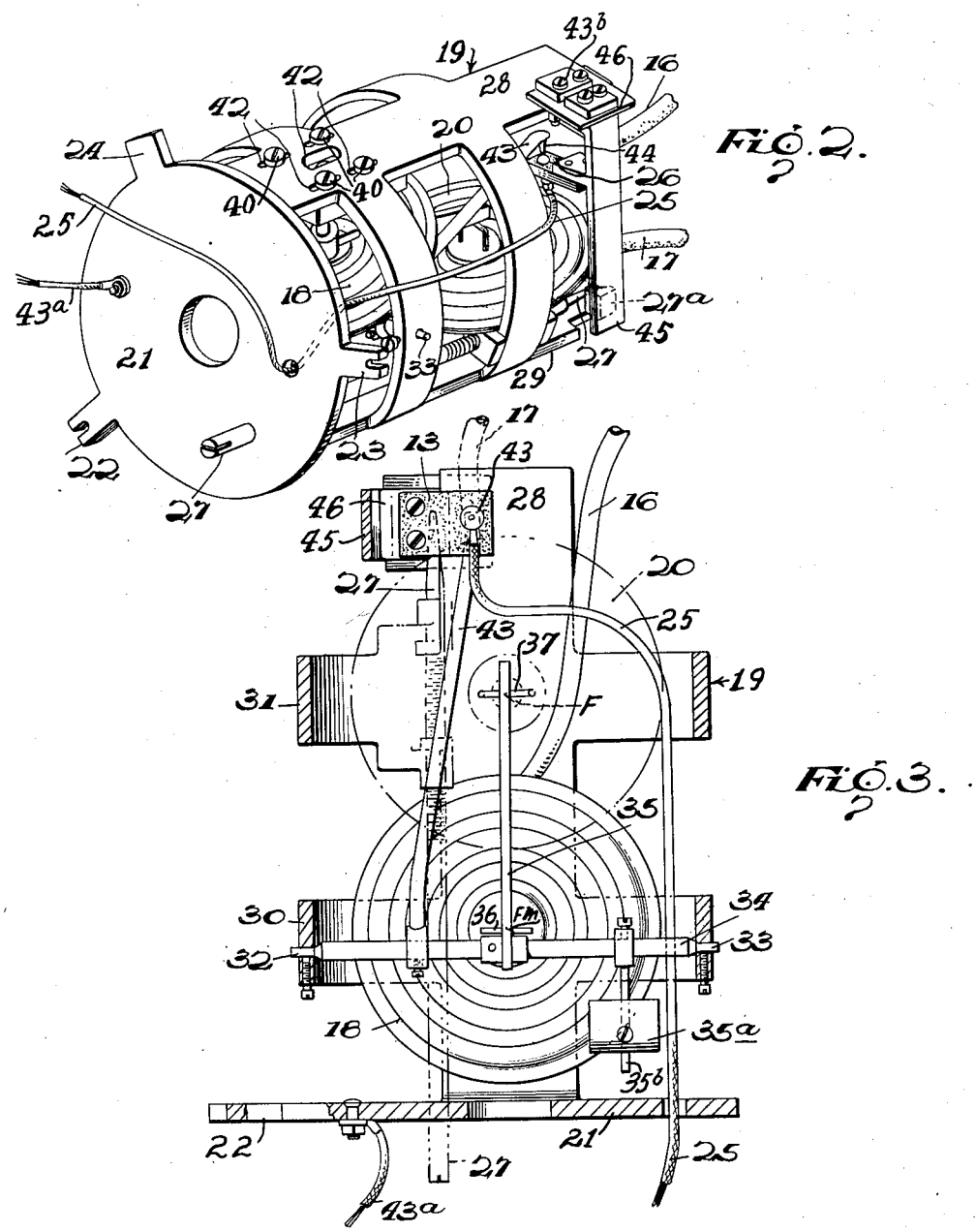

INVENTOR.
Richard A. Lee.
BY Herbert M. Birch
ATTORNEY

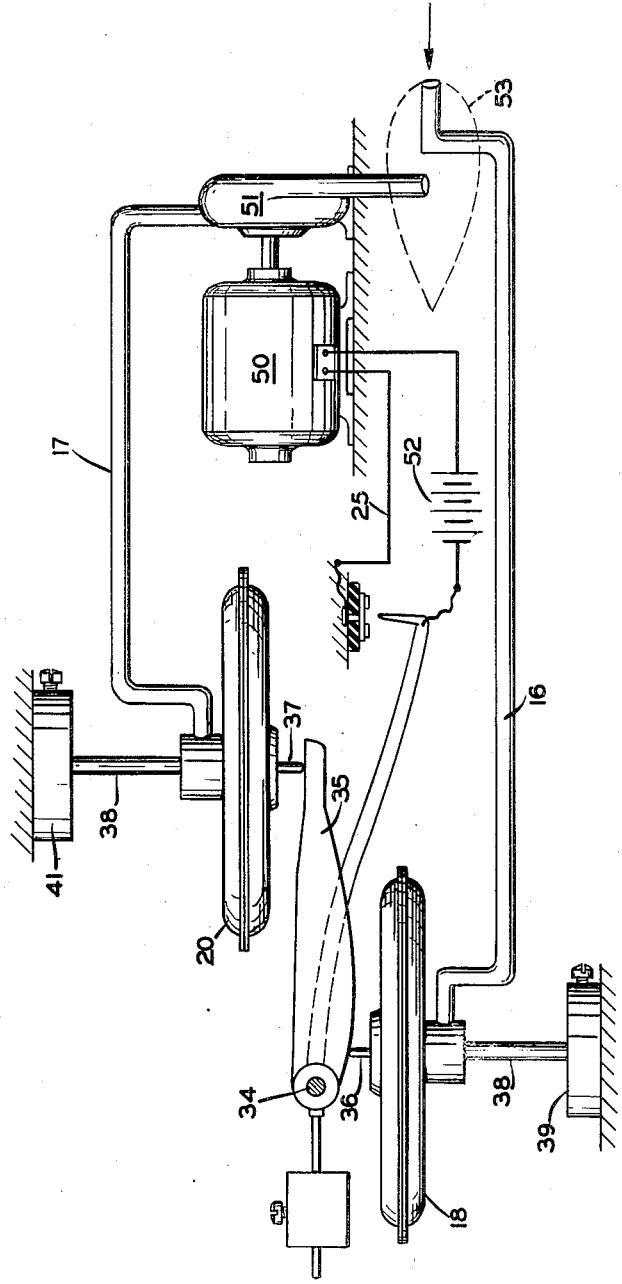

Patented Nov. 29, 1949

2,489,424

UNITED STATES PATENT OFFICE 2,489,424

CONTROL UNIT

Richard A. Lee, Bogota, N. J., assignor to Bendix Aviation Corporation, Teterboro, N. J., a corporation of Delaware Application December 11, 1943, Serial No. 513,963

2 Claims. (Cl. 103—25)

The present invention relates generally to a control device and more particularly to a condition responsive circuit control for motors operating fluid pumps, compressors or the like.

An object of the present invention is to provide novel control means, whereby the power circuit of a motor adapted to drive a pump or the like is controlled through means responsive to pressures created by the pump or the like driven thereby.

Another object is to provide a novel control means responsive to differentials in pressure, which has utility in connection with airspeed computing systems, mileage units or the like.

Another object is to provide novel improvements in control means for use with air position indicator systems, whereby power for driving a driven member, such as a supercharger, pump, blower or the like is interrupted intermittently according to differentials in pressure, to thereby control the speed of the driven member in proportion to airspeed.

Another object is to provide novel improvements in control units of the class set forth, wherein a novel and simplified lever arrangement between the condition responsive members is designed, whereby constantly opposed forces are exerted on said simplified lever arrangement, so as to make or break a contact associated with said lever when pressures in said condition responsive members are unbalanced, to thereby energize or deenergize a power circuit to control one source of pressure and rebalance the condition responsive members, and thereby make contact to energize or deenergize said power circuit.

Another object is to provide a novel condition responsive means designed for use in combination with a blower or the like and an electrical driving means for the same, whereby a pressure balance is maintained between the blower pressure and a base pressure, such as Pitot pressure by constant regulation of the blower speed.

Another object is to provide a novel control unit for a true airspeed device including condition responsive means actuated by pressure from a power driven blower or the like rotating in accordance with airspeed and actuated by Pitot impact and static pressures, whereby upon variation between blower pressure and Pitot impact and static pressures, power to said blower is interrupted, so that the speed of rotation of said blower or the like is either increased or decreased to maintain said pressures proportional and thereby measure changes in airspeed.

Another object is to provide an improved novel control means having a pair of pressure responsive members actuated by different sources of pressure adapted to provide constantly opposed balanced moments of force against a switch actuator means to maintain a circuit, until one source of pressure changes to unbalance said moments of force and the circuit is thereby opened.

Yet another object is to provide a novel fluid actuated switch, which is simple in construction, instantly responsive at either slow or rapid pressure changes, and more readily assembled and adjusted in comparison with other devices of this type.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

In the drawings, wherein like reference characters refer to like parts throughout the several views, Figure 1 is an exploded perspective view of an instrument casing, part of the mechanism, and of the inside surface of a cover therefor.

Figure 2 is a perspective view of the supporting frame for the units showing them mounted therein, which fits within the casing.

Figure 3 is a longitudinal cross section view of the frame showing a front view of the control units attached thereto.

Figure 6 is a diagrammatic view illustrating the points of applied moments of force.

Figure 8 is a schematic wiring diagram of the pump and motor showing the control thereof by the lever system.

Figure 7:
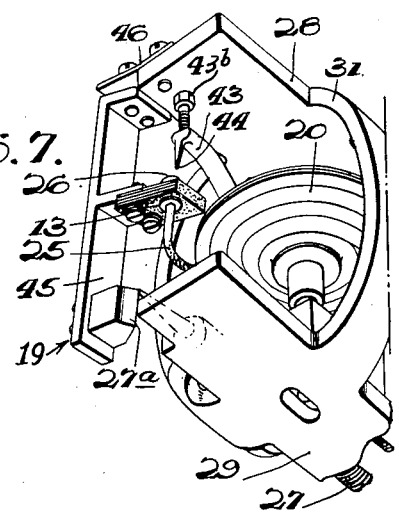
Figure 7 is an end perspective view of a fragment of the frame showing details of the contacts arrangement.

Referring to the drawings in detail, and in particular to Figure 1, the entire device is enclosed in a casing 10, which is made airtight and provided with a top or cover 11 having an electrical outlet plug 12 in circuit with a contact 26 or terminal wires on an insulation contact support plate 13, best shown in Figure 7, and a suitable power circuit illustrated in Figure 8, adapted to drive an electric motor 50 in driving connection with a mechanical source of pressure supply, such as the compressor 51, more fully shown and described in co-pending application Serial No. 512,013 filed November 27, 1943, now Patent 2,441,381, May 11, 1948, and assigned to the assignee of the present invention.

In the bottom of casing 10 are provided three openings, in which are coupled tubes 15, 16 and 17. Tube 15 is connected to the static inlet of the usual Pitot tube 53 (Figure 8) and discharges into the interior of the casing 10, while tube 16 conveys the Pitot impact pressure into a diaphragm 18 mounted in frame 19 and tube 17 conveys pressure output from a compressor 51 into a diaphragm 20 mounted in frame 19, see Figure 4.

Frame 19 comprises a head plate 21 adapted to be secured to the under side of cover 11 by lugs 22, 23 and 24. Plate 21 is also drilled, so as to provide apertures for wire 25 from the contact 26 and for taper screw adjustment 27, said screw 27 having a threaded bearing in the frame 19 and supported in contact with anvil 27a of resiliently mounted contact 26, as shown in Figures 5 and 7.

Figure 4:
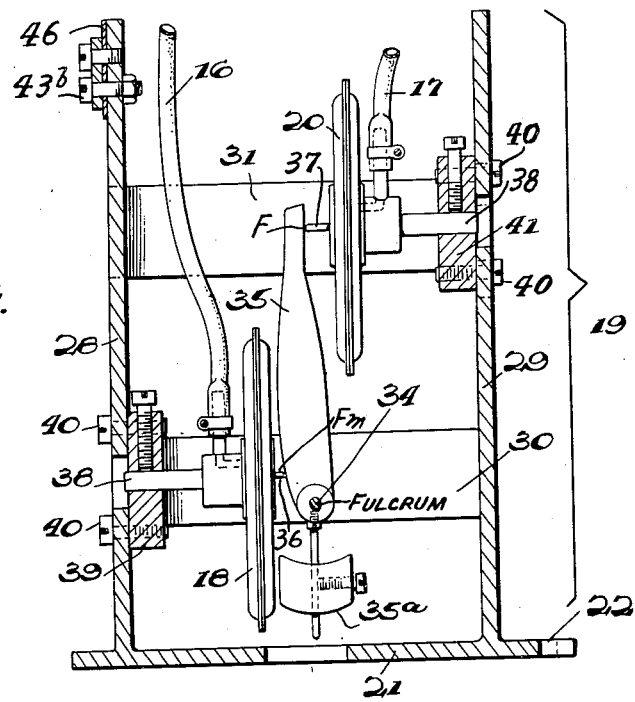
Figure 4 is a longitudinal section view of the frame at right angles to Fig. 3 showing an edge view of the diaphragms mounted in the frame.

Extending from head plate 21 are standards 28 and 29, as shown in Figure 4, which are spaced apart and substantially parallel to each other, and held stable by members 30 and 31, adapted to bridge part of the space adjacent each end of standards 28 and 29.

Bridge member 30 is drilled through at opposite points midway between standards 28 and 29 to receive reduced ends 32 and 33 of rock shaft 34, see Figure 3. Rock shaft 34 extends across the bridge member 30 at right angles to standards 28 and 29 and has secured thereto a balance lever 35 and a balance weight 35a radially adjustable on a rotatably adjustable arm 35b. Weight 35a counterbalances the weight of the lever 35 about the rock shaft 34.

Figure 5:
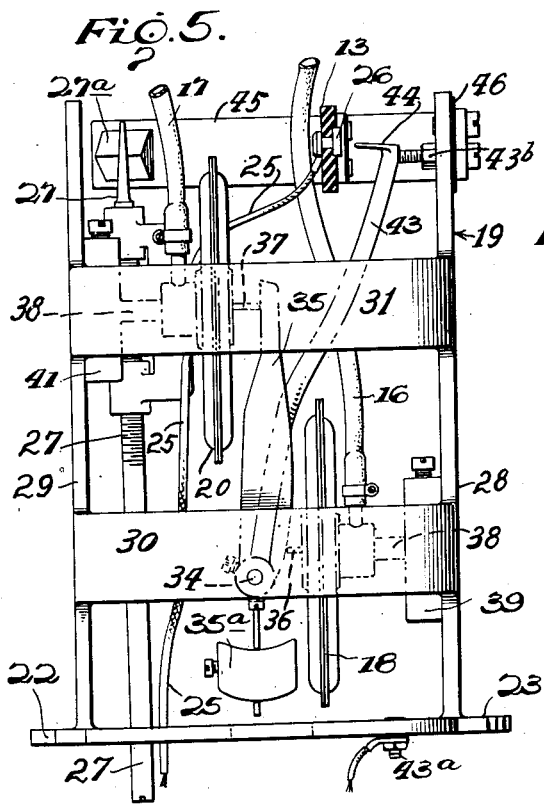
Figure 5 is a longitudinal side elevation view, partly in section, of the diaphragm and controls therefor mounted in the frame of the opposite side to that of Figure 4.

The balance lever 35 is so positioned, proportioned and shaped as to extend between the two diaphragms 18 and 20, which diaphragms are provided with force applying loops 36 and 37, see Figures 4 and 5, that are always in contact with the lever.

Loop 36 contacts lever 35 at point $Fm$ below and at one side of shaft 34, while loop 37 contacts lever 35 at point F on the side opposite to point F, see diagram Figure 6.

Diaphragm 18 is mounted on a shaft or post 38 seated in block 39 secured to standard 28 by screws 40 and diaphragm 20 is similarly mounted on a shaft or post 38 seated in block 41 on standard 29. One or both of the blocks may be mounted, so as to be adjustable longitudinally of the standard to which it is attached, such as shown in connection with standard 28, Figure 4, which is provided with elongated screw holes 42, as shown in Figure 2, to permit such adjustment.

The diaphragm 18 is connected through its mounting in its post hub or stud to the impact pressure line 16 from a suitable Pitot tube 53 and diaphragm 20 is connected similarly in the compressor output line 17, so that diaphragm 18 exerts force at point $Fm$ and diaphragm 20 exerts force at point F on opposite alternate sides of lever 35. The points $Fm$ and F at which the diaphragms 18 and 20 contact the lever 35 through the medium of the loops 36 and 37, are spaced apart near the fulcrum or shaft 34 and near the free or outer end of the lever 35, to establish a predetermined differential between said forces or pressures in accordance with any variation desired and to maintain a normal balance under such predetermined differential or proportion. The points $Fm$ and F on the lever 35 correspond to the points of application of power and weight, respectively, on a lever of the second kind; the power in this case being the lower pressure of bellows 20 offsetting the weight as represented by the higher pressure of bellows 18, the rock shaft 34 being the fulcrum of the lever. The pressure in bellows 20 is approximately one-ninth that in bellows 18.

Secured to rock shaft 34 is an elongated contact arm 43 having a contact 44 grounded to frame 19 through shaft 34 and terminal 43a while a stop screw 43b limits and adjusts the movements of lever 35 and arm 43, see Figures 2 and 7, to thereby cooperate with contact 26 of plate 13 in the power circuit to the compressor drive motor 50.

Contact support plate 13 for contact 26 is secured to a bar 45 resiliently attached to standard 28 by suitable means, such as leaf spring 46 and is adjustable against the action of spring 46 shown in Figure 7, if desired by turning taper screw 27 in contact with anvil 27a on bar 45.

Operation

Having thus far described the several elements of the device, brief reference is now made to the operation of the device.

Assume for example, the device is mounted on an aircraft, in a system for true airspeed and air mileage indication with the diaphragms 18 and 20 and parts within casing 10 subject to prevailing static pressure from tube 15 by connection to the static inlet of the usual Pitot tube not shown, and that speed of the craft is suddenly increased to unbalance the moments of force F and $Fm$. Such speed increase is instantly transmitted to the control diaphragm 18, to expand the latter by an increase in impact Pitot pressure through line 16 and an added force is applied to lever 35 and point $Fm$, whereupon the balance normally holding contact 44 of arm 43 away from contact 26 is overcome by an unbalancing of the forces so that lever 35 moves and closes contact through arm 43 between contacts 44 and 26. As the contacts 26 and 44 are closed a circuit from battery 52 is completed to the compressor drive motor 50 and a pressure established in diaphragm 20 through the compressor output line 17 proportional to the stepped-up pressure of diaphragm 18.

When the pressure in diaphragm 20 is proportional to the pressure in diaphragm 18, a condition of equilibrium exists and forces applied at F and $Fm$ are balanced, contacts 26 and 44 are broken by opposite movement of the lever 35 and arm 43 with the shaft or fulcrum 34 assisted by the balancing weight 35a, and the compressor circuit is deenergized. This condition of equilibrium is maintained by the continued intermittent repetition of the above described operating cycle by increase of the pressure in the diaphragm 18 and expansion thereof.

There is thus provided a novel pressure actuated control adapted to intermittently make and break a power circuit, so as to maintain a balance between the output pressure of an electrically driven air compressor or the like and Pitot tube impact and static pressure outputs, so as to accurately provide for true airspeed and mileage computations even at excessively high speeds.

Although the present invention is only described and illustrated in detail for one embodiment thereof, it is to be expressly understood that the same is not limited thereto. Various changes may be made in design and arrangement of the parts of the device illustrated, as will now be apparent to those skilled in the art. For a definition of the limits of the invention, reference should be had to the appended claims.

I claim:

1. A control unit comprising two pressure responsive members, a lever pivoted about a fulcrum at one end and acted upon by said pressure responsive members; said pressure responsive members acting upon said lever at unequal moment arms on the same side of the fulcrum to normally balance said lever; a source of dynamic pressure affecting the pressure member acting on the shorter moment arm of said lever, a compressor supplying the pressure affecting the member acting upon the longer moment arm of said lever, a switch adapted to be closed upon unbalance of said lever by an increase in the dynamic pressure, a motor adapted to operate said compressor, and a circuit including said motor and said switch to operate said motor upon switch closure to operate said compressor for increasing the pressure delivered thereby to its respective pressure responsive member to rebalance said lever.

2. A control unit comprising two pressure responsive members, a lever pivoted about a fulcrum at one end and acted upon by said pressure responsive members; said pressure responsive members acting upon said lever at unequal moment arms on the same side of the fulcrum to normally balance said lever; a source of dynamic pressure affecting the pressure member acting on the shorter moment arm of said lever, a compressor supplying the pressure affecting the member acting upon the longer moment arm of said lever, a fixed contact, a contact movable with said lever adapted to engage said fixed contact upon the unbalance of said lever, a motor adapted to operate said compressor, a circuit including both of said contacts and said motor to operate said motor upon engagement of said contacts for operating said compressor to increase the pressure delivered thereby to its respective pressure responsive member for rebalancing said lever, and camming means associated with said fixed contact for varying the degree of unbalance required before said movable contact engages said fixed contact.

RICHARD A. LEE.

REFERENCES CITED

The following references are of record in the file of this patent:

UNITED STATES PATENTS

| Number | Name | Date |
| --- | --- | --- |
| 574,846 | Freeman | Jan. 5, 1897 |
| 1,007,178 | Billings | Oct. 31, 1911 |
| 1,201,660 | Weatherhead et al. | Oct. 17, 1916 |
| 1,240,790 | Bristol | Sept. 18, 1917 |
| 1,451,064 | Dunajeff | Apr. 10, 1923 |
| 1,698,692 | Durdin | Jan. 8, 1929 |
| 1,744,684 | Griffith | Jan. 21, 1930 |
| 1,847,086 | Gargan | Mar. 1, 1932 |
| 1,942,913 | Beggs | Jan. 9, 1934 |
| 1,987,466 | Collin | Jan. 8, 1935 |
| 2,031,502 | Powell | Feb. 18, 1936 |
| 2,063,613 | McCarthy | Dec. 8, 1936 |
| 2,116,960 | Brown et al. | May 10, 1938 |
| 2,269,069 | Corbin | Jan. 6, 1942 |
| 2,297,706 | Jehle et al. | Oct. 6, 1942 |
| 2,376,142 | Hoffman et al. | May 15, 1945 |

FOREIGN PATENTS

| Number | Country | Date |
| --- | --- | --- |
| 352,702 | Great Britain | July 16, 1931 |
| 571,753 | France | Feb. 8, 1921 |